United States Patent [19]

Jacala et al.

[11] Patent Number: 5,350,277
[45] Date of Patent: Sep. 27, 1994

[54] CLOSED-CIRCUIT STEAM-COOLED BUCKET WITH INTEGRALLY COOLED SHROUD FOR GAS TURBINES AND METHODS OF STEAM-COOLING THE BUCKETS AND SHROUDS

[75] Inventors: Ariel C. P. Jacala; R. Paul Chiu, both of Scotia, N.Y.

[73] Assignee: General Electric Company, Schenectady, N.Y.

[21] Appl. No.: 979,247

[22] Filed: Nov. 20, 1992

[51] Int. Cl.$^5$ .............................. F01D 5/18
[52] U.S. Cl. .................... 416/90 R; 416/95; 416/97 R
[58] Field of Search .......... 415/115, 116; 416/90 R, 416/91, 95, 96 R, 97 R

[56] References Cited

U.S. PATENT DOCUMENTS

| 2,920,865 | 1/1960 | Lombard | 416/97 R |
| 3,051,439 | 8/1962 | Hilton | 416/97 R |
| 4,073,599 | 2/1978 | Allen et al. | 416/97 R |

FOREIGN PATENT DOCUMENTS

| 0332303 | 8/1991 | Japan | 416/96 R |
| 0806033 | 12/1958 | United Kingdom | 416/90 |
| 0880069 | 10/1961 | United Kingdom | 416/96 |
| 0904546 | 8/1962 | United Kingdom | 416/90 R |

Primary Examiner—Edward K. Look
Assistant Examiner—Mark Sgantzos
Attorney, Agent, or Firm—Nixon & Vanderhye

[57] ABSTRACT

The bucket 10 of a gas turbine includes first and second steam supply passageways 32 and 34 for directing cooling steam radially outwardly along the bucket. Steam return passageways 40, 42 and 44 lie adjacent the trailing edge for returning cooling steam to its source. A shroud is disposed at the bucket tip and has cross-over passages communicating the supply steam from the first and second passageways to the fifth, third and fourth passageways, respectively.

14 Claims, 3 Drawing Sheets

CLOSED-CIRCUIT STEAM-COOLED BUCKET WITH INTEGRALLY COOLED SHROUD FOR GAS TURBINES AND METHODS OF STEAM-COOLING THE BUCKETS AND SHROUDS

TECHNICAL FIELD

The present invention relates to closed-circuit steam-cooled buckets with integral steam-cooling passages in the buckets and bucket shrouds to reduce metal temperatures and particularly relates to buckets for use in gas turbine engines specifically designed to improve cooling for high-temperature gas turbine applications and methods for steam-cooling the buckets and shrouds.

BACKGROUND

Gas turbine buckets have historically been either uncooled or cooled by compressor bleed air. For example, cooled aircraft and land-based gas turbine buckets have used compressor bleed air as the cooling medium to obtain service temperatures within the portion of the bucket exposed to the hot gas stream for acceptable creep and oxidation life. For firing temperatures up to about 2350° F., the first-stage bucket has been cooled convectively by compressor bleed air in a serpentine passage arrangement with turbulence promoters within the passages to improve the rate of heat transfer with the flow exiting through trailing edge cooling holes. Similarly, the second-stage bucket for the same machine has been cooled by compressor bleed air flowing through machined radial holes with turbulence promoters to enhance heat transfer with the flow exiting through the tip. For firing temperatures between 2350° F. and 2600° F. in aircraft gas turbines, buckets have been cooled by compressor bleed air exiting through the leading edge and providing an insulating film of air about the buckets.

The foregoing-described cooling schemes, however, sacrifice compressor air flow and this puts practical limits on compressor pressure ratio, compressor efficiency, overall efficiency and overall plant heat rate. In land-based gas turbines used for electrical power generation, there are competing demands for the use of compressor bleed air, not only for cooling turbine components but also for dilution flow in the combustion system to lower oxides of nitrogen in the turbine exhaust. As the turbine firing temperatures increase, additional compressor bleed air is needed to cool the turbine components. Turbine buckets cooled with a boundary layer film of air place even greater demands for compressor bleed air. Turbine bucket cooling, in that case, may only be successfully employed at the expense of overall thermal efficiency. In aircraft gas turbines, those schemes, however, can be employed with reasonable success.

Further, in shrouded bucket designs, the shrouds have previously been uncooled. Coolant, such as compressor bleed air, exiting the airfoil tip is largely ineffective for cooling the shroud. With higher firing temperatures and higher bucket tip gas temperatures, the necessity for tip shroud cooling has arisen.

DISCLOSURE OF THE INVENTION

With the advent of combined cycle power plants, steam has become available for gas turbine component cooling without the use of compressor air. By using steam extracted from the steam turbine circuit, the gas turbine serves as a steam recuperator, while at the same time cooling the turbine components. It is, however, necessary to provide a completely closed circuit for the extracted steam flow within the gas turbine. The net effect of using steam-cooling is a net increase in overall thermal efficiency as compared to air cooling of gas turbine components via compressor bleed air. The superior mass and heat transport capabilities of steam renders it a superior cooling medium as compared with air.

Furthermore, steam can be employed in the present invention to integrally cool the shrouds of the buckets. Thus, flow path sealing and vibration control are obtained with steam-cooling of the shrouds, while at the same time maintaining shroud temperatures at acceptable levels, even at higher firing and flow path temperatures.

According to the present invention, there is provided turbine bucket bodies having typical airfoil shapes from root to tip, with each bucket body carrying a generally radially extending steam supply passage and a radially inwardly extending steam return passage. Each turbine bucket has a shank in which there is provided steam supply and steam return channels, respectively, in communication with the steam supply and return passages of the bucket body. The bucket body is also provided with a shroud having a radially outwardly projecting tip seal and an internal cross-over passage in communication with the steam supply passage and the steam return passage to turn the steam flow direction from the radially outwardly directed steam flow along the steam supply passage to a radially inwardly directed flow along the steam return passage. More particularly, the steam supply passage has first and second discrete steam supply passageways. The steam return passage includes three discrete steam return passageways, i.e., third, fourth and fifth steam return passageways. The shroud includes a pair of body portions which straddle the seal tip and provide cross-over passages for returning the steam supplied to the shroud by the steam supply passageways to the steam return passageways. The first steam supply passageway extends adjacent the leading edge of the bucket body and communicates with the fifth steam return passageway adjacent the bucket trailing edge via a cross-over passage in the shroud. The second steam supply passageway communicates with the third and fourth steam return passageways, also via a cross-over passage within the shroud. The steam supply passageways lie in communication one with the other by virtue of a partition having a plurality of radially spaced apertures. Similarly, the steam return passageways are divided by partitions having apertures whereby steam communicates between the steam return passageways.

In a preferred embodiment according to the present invention, there is provided a closed-circuit steam-cooling system for turbine buckets comprising a generally elongated radially extending turbine bucket body having a surface in the form of an airfoil, root and tip portions, generally radially extending leading and trailing edges, and a plurality of generally radially extending interior passages, including a generally radially outwardly directed steam supply passage for flowing steam from the root portion along the body to the tip portion and a generally radially inwardly directed steam return passage for flowing steam from the tip portion along the body to the root portion for steam-cooling the bucket body. Also provided is a shroud carried by the tip portion of the bucket body and having a cross-over passage in communication with the steam supply passage and the steam return passage for turning the steam from generally radially outwardly directed flow along the steam supply passage to generally radially inwardly directed flow along the steam return passage.

In a further preferred embodiment according to the present invention, there is provided a method for steam-cooling turbine buckets each having a generally elongated radially extending turbine bucket body having a surface in the form of an airfoil, root and tip portions, and a shroud adjacent the tip portion comprising the steps of flowing steam along a generally radially outwardly directed steam supply passage in the bucket body from the root portion to the tip portion for steam-cooling the bucket body, flowing steam along a generally radially inwardly directed steam return passage in the bucket body from the tip portion to the root portion for steam-cooling the bucket body and flowing steam from the steam supply passage adjacent the tip portion through a cross-over passage in the shroud and into the steam return passage for cooling the shroud and turning the steam from the generally radially outwardly directed flow along the steam supply passage to the generally radially inwardly directed flow along the steam return passage.

Accordingly, it is a primary object of the present invention to provide in a gas turbine a closed-circuit steam-cooling system for the gas turbine buckets and shrouds and methods of steam-cooling turbine buckets and shrouds whereby high heat transfer rates within the air buckets are achieved to obtain metal temperatures at very high external gas temperatures.

BEST MODE FOR CARRYING OUT THE INVENTION

Reference will now be made in detail to a present preferred embodiment of the invention, an example of which is illustrated in the accompanying drawings.

Figure 1:
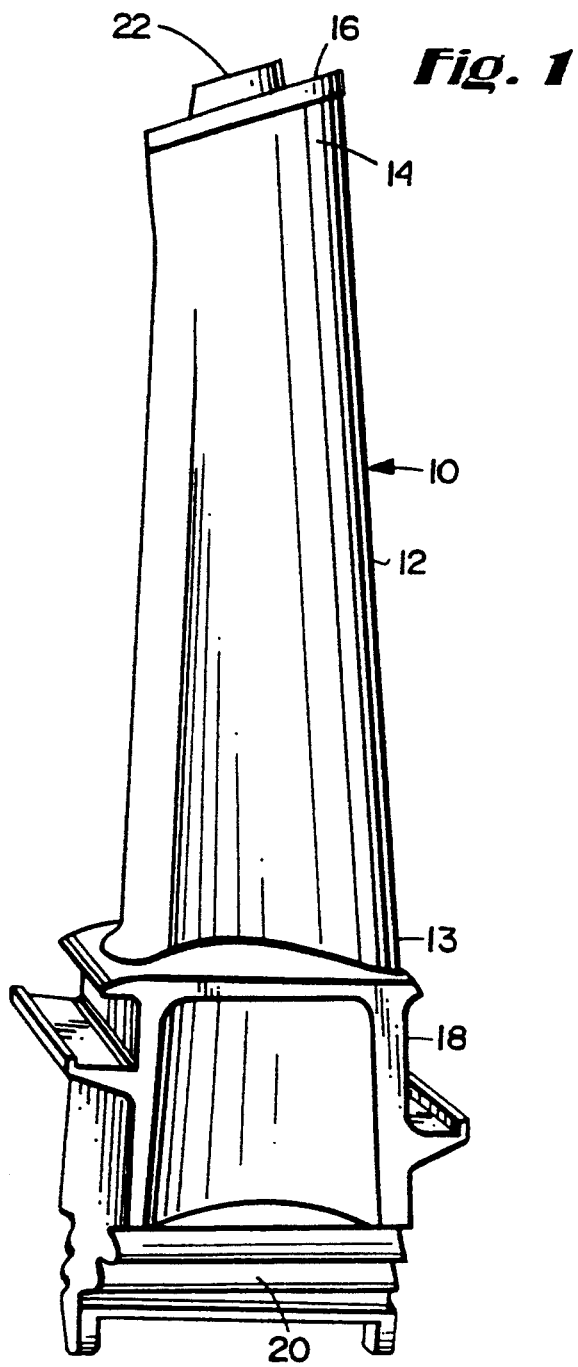
FIG. 1 is a perspective view illustrating a gas turbine bucket including its shank, and root and tip portions, with shroud attached and having a steam-cooling arrangement in accordance with the present invention.

Referring now to FIG. 1, there is illustrated a turbine bucket having steam-cooling passages accordance with the present invention. The bucket includes an airfoil-shaped body section 12, root and tip portions 13 and 14, respectively, a shroud 16 adjacent tip portion 14 and a shank 18 having dovetail connecting elements 20 for securing the bucket in a complementary-shaped opening in a turbine rotor wheel, not shown. As will be appreciated by those skilled in the art, shroud 16 lies closely adjacent to the shrouds of adjacent turbine buckets. All such shrouds about the turbine rotor wheel, however, remain unattached to one another, i.e., to adjacent turbine bucket shrouds. Each shroud 16 includes a seal tip 22 which lies between first and second shroud body portions 24 and 26, respectively.

Figure 2:
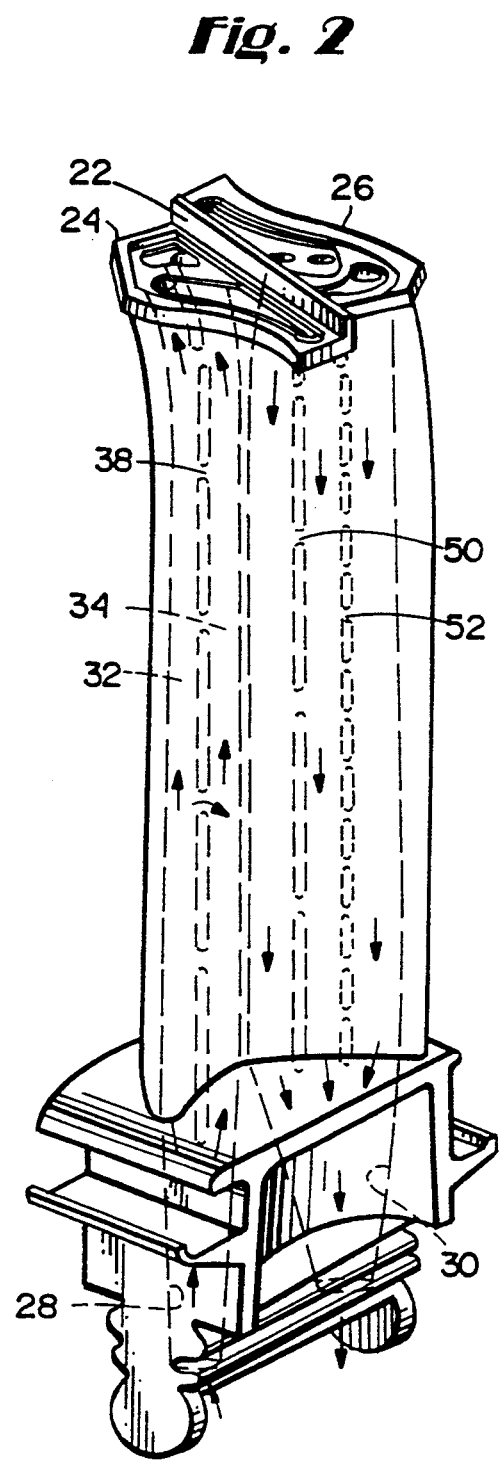
FIG. 2 is a perspective view of the bucket of FIG. 1 taken from a different angle illustrating the steam flow passages through the bucket and shroud and the shroud in an uncovered or open condition for illustration purposes only.
Figure 3:
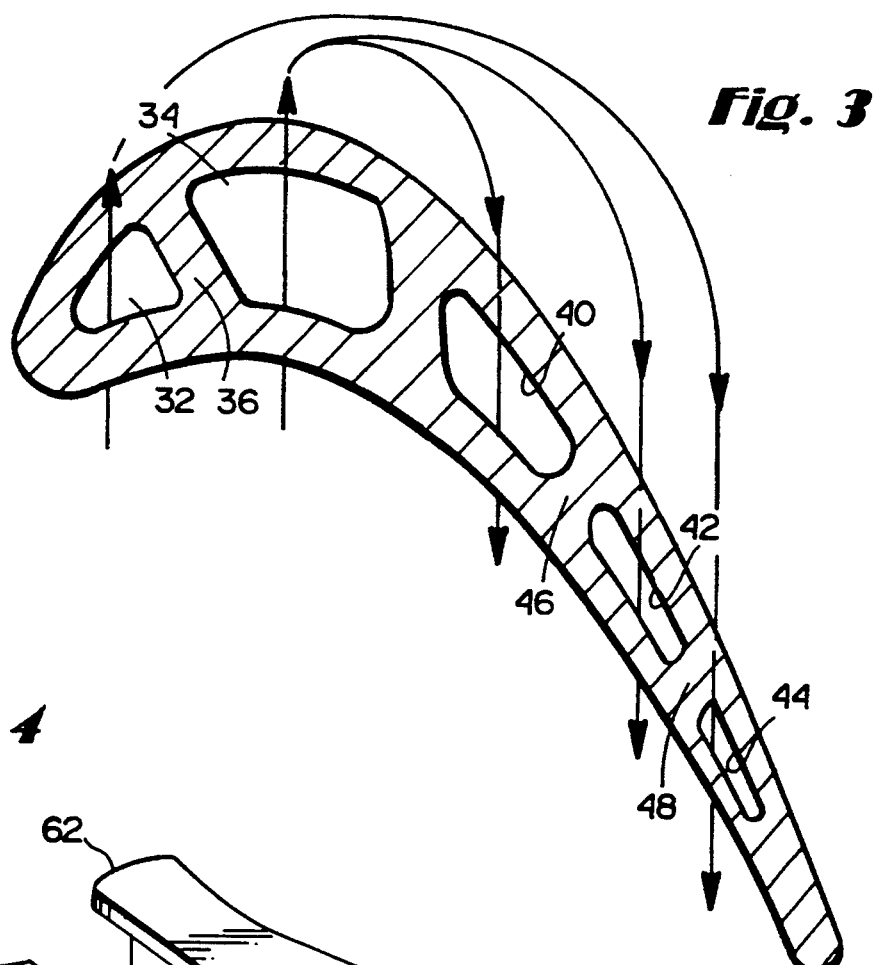
FIG. 3 is an enlarged cross-sectional view looking radially along the mid-section of the bucket illustrating the steam flow passageways.

Turning now to FIGS. 2 and 3, the shank portion 18 includes discrete steam supply and return channels 28 and 30 for supplying steam to steam a supply passage and steam return passage, respectively, in the bucket 10. More particularly, bucket 10 includes a generally radially outwardly directed steam supply passage comprising discrete first and second steam supply passageways 32 and 34, respectively, each lying in communication with the steam supply channel 28 in shank 18. As illustrated in FIG. 3, a partition 36 separates steam supply passageways 32 and 34 from one another. Partition 36 has, however, a plurality of radially spaced openings 38 therealong whereby supply steam may communicate between the respective steam supply passageways 32 and 36 at spaced locations radially outwardly along the bucket. Steam passageway 32 extends along the bucket directly adjacent its leading edge.

Bucket 10 also includes a generally radially inwardly directed steam return passage comprising discrete third, fourth and fifth return steam passageways 40, 42 and 44, respectively. The radially inner ends of steam passageways 40, 42 and 44 communicate with the steam return channel 30 in shank 18. Passageways 40, 42 and 44 are separated one from the other by partitions 46 and 48, each of which has openings 50 and 52 therealong, respectively, whereby steam returning through passageways 40, 42 and 44 communicates among the various passageways at radially spaced positions therealong. The passageways 32, 36, 40, 42 and 44 are preferably integrally formed, e.g., by investment casting, when the bucket is formed.

Figure 4:
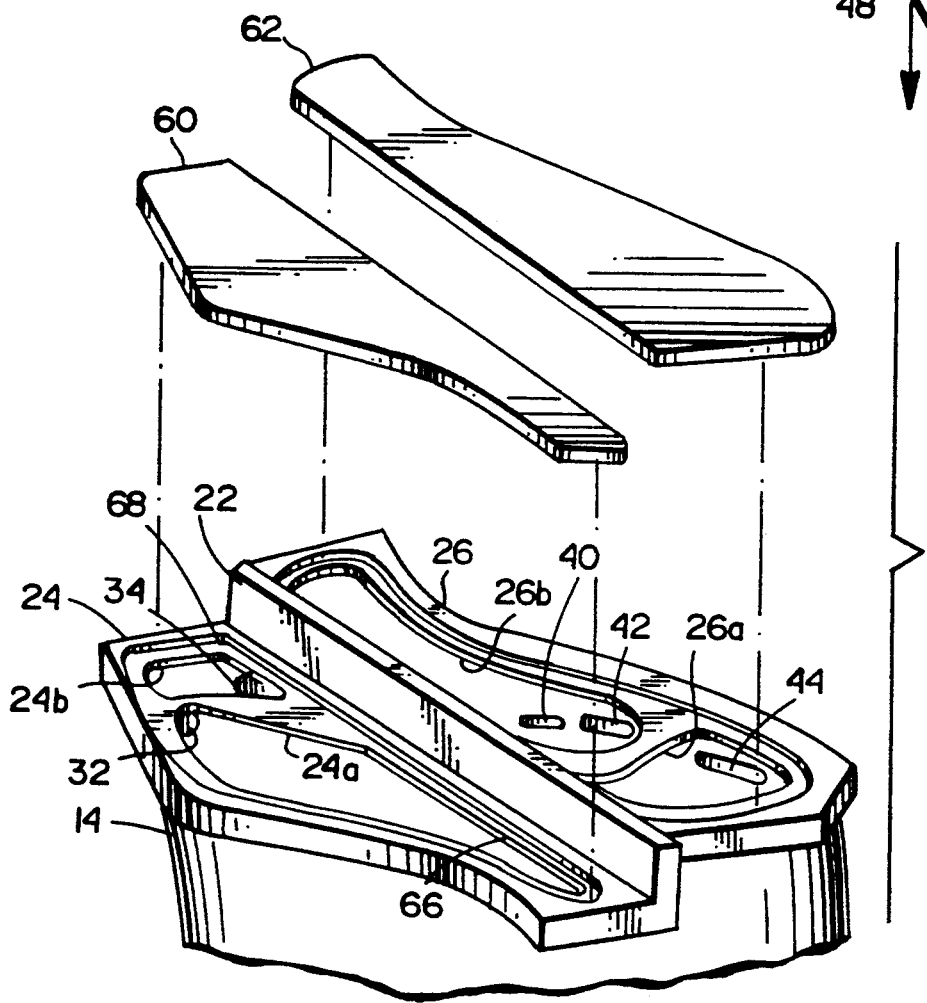
FIG. 4 is a fragmentary perspective view of the shroud with parts thereof illustrated in exploded juxtaposition.
Figure 5:
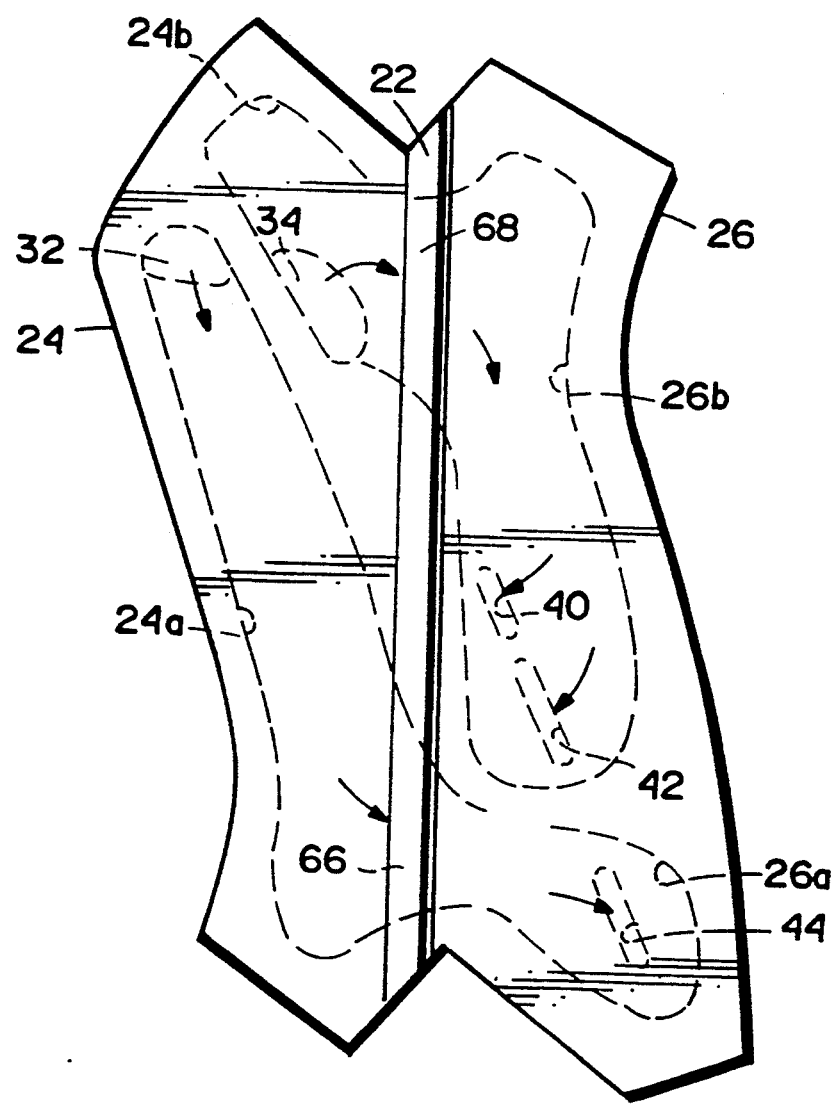
FIG. 5 is an end view of the shroud looking radially inwardly with the dashed lines illustrating the cross-over passages for flowing cooling steam between the steam supply and return passageways of the bucket.

Turning now particularly to FIG. 4, the shroud 16, not only carries the seal tip 22 but provides a cross-over passage for returning steam supplied to the tip portion of the bucket through the steam supply passage to the steam return passage. Particularly, as illustrated, each body portion 24 and 26 includes a pair of recesses. Particularly, body portion 24 includes recesses 24a and 24b which lie in communication with the radially outermost ends of steam passageways 32 and 34, respectively. Similarly, body portion 26 includes a pair of recesses 26a and 26b. Recess 26a communicates with the radially outermost end of passageway 44, while recess 26b lies in communication with the radially outermost ends of passageways 40 and 42. In one preferred form of the present invention, cover plates 60 and 62 overlie the body portions 24 and 26, closing the outer end of the shroud, the inner ends of the recesses 24a, 24b, 26a and 26b being closed by solid tip portions of the bucket. The cover plates 60 and 62 are preferably welded to the shroud portions 24 and 26. It will be appreciated that the shrouds can be otherwise formed, e.g., integrally cast.

Additionally, a pair of cross-over passages are provided in the shroud. Particularly, a cross-over passage 66 communicates between recess 24a and recess 26a of shroud body portions 24 and 26, respectively. A cross-over passage 68 also communicates between recess 24b and recess 26b. Passages 66 and 68 underlie the seal tip 22. As a consequence of this arrangement, steam supplied along the steam supply passage comprising passageways 32 and 36 enters the recesses 24a and 24b, respectively, for flow through the cross-over passages 66 and 68, respectively, into recesses 26a and 26b. The steam in passage 26a then flows into the return passageway 44, while the steam in recess 26b flows into the return passageways 40 and 42. Thus, steam flows through passageways 32 and 34, crosses over at the shroud and returns via a pair of passageways comprised of passageways 40 and 44 or 42 and 44.

In operation, the steam supplied through steam supply channels 20a flows radially outwardly along steam supply passageways 32 and 34. The steam from passage 32 enters the recess 24a in shroud body portion 24, passes through cross-over passage 66 and enters the recess 26a in shroud body portion 26 for return through steam return passageway 44 to steam return channel 30 in shank 18. Steam flowing in steam supply channel 28 also flows radially outwardly through steam supply passageway 34. Steam entering recess 24b from supply passageway 34 passes through cross-over passage 68 into recess 26b. The steam in recess 26b flows into the return passageways 40 and 42 for return through steam return channel 30 in shank 18. It will be appreciated that the shroud performs the function of raising the natural frequency of the airfoil structure by providing a substantially thick support at the airfoil tip to reduce any propensity for vibration or flutter-type instabilities and provide structural damping in the assembly. It also additionally provides flowpath sealing and reduces secondary flow losses from tip leakage. The shroud forms an integral part of the bucket and thus plays an important role in vibration control and aerodynamic efficiency.

It will be appreciated that the cooling steam flow in the bucket and shroud passages reduces bucket metal temperatures by forced convection heat transfer. The passageways within the bucket airfoil may or may not employ turbulence enhancers, i.e., ribs projecting from and preferably integrally cast with the side walls of the cavities. Additionally, steam-cooling of the bucket shrouds allows for bucket integrity under high temperature service, enabling higher temperature turbine operations which, in turn, result in higher stage efficiency. As noted previously, the steam-cooling of turbine buckets and shrouds in accordance with the present invention advantageously does not utilize compressor air flow for bucket cooling whereby overall turbine efficiency is improved. Moreover, steam used as a cooling medium has better mass and heat transport properties than air. Additionally, the shroud, when cooled by the steam via the cross-over passages 66 and 68, enables higher temperature operation at the region.

It will be appreciated the particular number and arrangement of the passageways within the bucket and shroud are not limiting with respect to this invention. For example, there can be more or less than five passageways through the bucket airfoil section. Further, additional cross-over passageways can be formed through the shroud.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A closed-circuit steam-cooling system for turbine buckets comprising:

a generally elongated radially extending turbine bucket body having a surface in the form of an airfoil, root and tip portions, generally radially extending leading and trailing edges, and a plurality of generally radially extending interior passages, including a generally radially outwardly directed steam supply passage for flowing steam from said root portion along said body to said tip portion and a generally radially inwardly directed steam return passage for flowing steam from said tip portion along said body to said root portion for steam-cooling said bucket body, said steam supply passage extending along said body adjacent said leading edge and said steam return passage extending along said body between said steam supply passage and said trailing edge;

a shroud carried by said tip portion of said bucket body and having a cross-over passage in communication with said steam supply passage and said steam return passage for turning the steam from generally radially outwardly directed flow along said steam supply passage to generally radially inwardly directed flow along said steam return passage, said shroud including a shroud seal tip projecting generally radially outwardly of said shroud leaving first and second body portions of said shroud on opposites sides of said seal tip, said steam supply passage opening into said cross-over passage in said first body portion on one side of said seal tip, said steam return passage opening into said cross-over passage in said second body portion on the opposite side of said seal tip.

2. A system according to claim 1 wherein said shroud is integrally cast.

3. A system according to claim 1 wherein said steam supply passage includes first and second discrete passageways and said steam return passage includes a pair of discrete passageways, the first-mentioned cross-over passage lying in communication with said first steam supply passageway and one of said pair of discrete steam return passageways, and a second discrete cross-over passage in communication with said second steam supply passageway and another of said pair of discrete steam return passageways.

4. A system according to claim 3 wherein said steam return passage includes third, fourth and fifth discrete passageways, two of which constitute said pair of discrete passageways, one of said first and second cross-over passages lying in communication with said fifth passageway, said fifth passageway extending along said bucket adjacent said trailing edge.

5. A system according to claim 3 including a partition in said steam supply passage defining at least one aperture between said root portion and said tip portion for communicating steam between said first and second discrete passageways.

6. A system according to claim 3 including a partition in said steam return passage defining at least one aperture between said root portion and said tip portion for communication between said pair of discrete passageways.

7. A system according to claim 1 including a shank for said bucket body connected to said root portion thereof, and discrete steam supply and return channels in said shank in communication with said steam supply and return passages, respectively, in said bucket body.

8. A system according to claim 3 wherein said first steam supply passageway lies adjacent the leading edge of said bucket body and said one of said pair of steam return passageways lies adjacent the trailing edge of said bucket body.

9. A system according to claim 8 wherein said second steam supply passageway and said another of said pair of return passageways lie between said first steam supply passageway and said one of said pair of said return passageways and in a mid-region of said bucket between said leading and trailing edges.

10. A closed-circuit steam-cooling system for turbine buckets comprising:
 a generally elongated radially extending turbine bucket body having a surface in the form of an airfoil, root and tip portions, generally radially extending leading and trailing edges, and a plurality of generally radially extending interior passages, including a generally radially outwardly directed steam supply passage for flowing steam from said root portion along said body to said tip portion and a generally radially inwardly directed steam return passage for flowing steam from said tip portion along said body to said root portion for steam-cooling said bucket body;
 a shroud carried by said tip portion of said bucket body and having a cross-over passage in communication with said steam supply passage and said steam return passage for turning the steam from generally radially outwardly directed flow along said steam supply passage to generally radially inwardly directed flow along said steam return passage; and
 a shroud seal tip projecting generally radially outwardly of said shroud leaving first and second body portions of said shroud on opposite sides of said seal tip, said steam supply passage opening into said cross-over passage in said first body portion on one side of said seal tip, said steam return passage opening into said cross-over passage in said second body portion on the opposite side of said seal tip;
 said shroud including a recess in said first body portion in communication between said steam supply passage and said cross-over passage, a recess in said second body portion in communication between said steam return passage and said cross-over passage, at least one outer cover plate overlying at least one of said recesses and means for securing said cover plate and said shroud to one another.

11. A closed-circuit steam-cooling system for turbine buckets comprising:
 a generally elongated radially extending turbine bucket body having a surface in the form of an airfoil, root and tip portions, generally radially extending leading and trailing edges, and a plurality of generally radially extending interior passages, including a generally radially outwardly directed steam supply passage for flowing steam from said root portion along said body to said tip portion and a generally radially inwardly directed steam return passage for flowing steam from said tip portion along said body to said root portion for steam-cooling said bucket body;
 a shroud carried by said tip portion of said bucket body and having a cross-over passage in communication with said steam supply passage and said steam return passage for turning the steam from generally radially outwardly directed flow along said steam supply passage to generally radially inwardly directed flow along said steam return passage;
 said steam supply passage including first and second discrete passageways and said steam return passage includes a pair of discrete passageways, the first-mentioned cross-over passage lying in communication with said first steam supply passageway and one of said pair of discrete steam return passageways, and a second discrete cross-over passage in communication with said second steam supply passageway and another of said pair of discrete steam return passageways; and
 a shroud seal tip projecting generally radially outwardly of said shroud leaving first and second body portions of said shroud on opposite sides of said seal tip, said first steam supply passageway opening into said first cross-over passage in said first body portion on one side of said seal tip and said one steam return passageway opening into said first cross-over passage in said second body portion of the opposite side of said seal tip, said second steam supply passageway opening into said second cross-over passage in said first body portion on one side of said seal tip and said another of said pair of discrete steam return passageways opening into said second cross-over passage in said second body portion on the opposite side of said seal tip.

12. A method for steam-cooling turbine buckets each having a generally elongated radially extending turbine bucket body having a surface in the form of an airfoil, root and tip portions, and a shroud adjacent said tip portion comprising the steps of:
 flowing steam along a generally radially outwardly directed steam supply passage in said bucket body from said root portion to said tip portion for steam-cooling said bucket body;
 flowing steam along a generally radially inwardly directed steam return passage in said bucket body from said tip portion to said root portion for steam-cooling said body body;
 flowing steam from said steam supply passage adjacent said tip portion through a cross-over passage in said shroud and into said steam return passage for cooling said shroud and turning the steam from the generally radially outwardly directed flow along said steam supply passage to the generally radially inwardly directed flow along said steam return passage; and
 forming a first recess along a first body portion of the shroud along one side of said bucket body in communication with said steam supply passage, forming a second recess along a second body portion of the shroud along the opposite side of said bucket body in communication with said steam return passage, and flowing steam from said steam supply passage into said first recess for flow through said cross-over passage into said second recess and to said steam return passage.

13. A method according to claim 12 wherein the turbine buckets form part of a gas turbine and the steam is recuperated as it flows through said passageways.

14. A method for steam-cooling turbine buckets on a gas turbine, each bucket having a generally elongated radially extending turbine bucket body having a surface in the form of an airfoil, root and tip portions, and a shroud adjacent said tip portion comprising the steps of:
 flowing steam along a generally radially outwardly directed steam supply passage in said bucket body from said root portion to said tip portion for steam-cooling said bucket body;

flowing steam along a generally radially inwardly directed steam return passage in said bucket body from said tip portion to said root portion for steam-cooling said bucket body;

flowing steam from said steam supply passage adjacent said tip portion through a cross-over passage in said shroud and into said steam return passage for cooling said shroud and turning the steam from the generally radially outwardly directed flow along said steam supply passage to the generally radially inwardly directed flow along said steam return passage;

said steam supply passage including first and second discrete passageways and said steam return passage including a pair of discrete passageways, and further including the steps of flowing through the first-mentioned cross-over passage steam in communication with said first steam supply passageway and into one of said pair of discrete steam return passageways, and flowing through a second discrete cross-over passage in said shroud steam in communication with said second steam supply passageway and into another of said pair of discrete steam return passageways; and the turbine buckets forming part of a gas turbine and the steam being recuperated as it flows through said passageways and further including flowing steam between said first and second discrete passageways through at least one aperture in communication between said first and second discrete passageways and located between said root portion and said tip portion.

* * * * *